United States Patent
Shirlen et al.

(10) Patent No.: US 9,158,720 B2
(45) Date of Patent: Oct. 13, 2015

(54) SYSTEM AND METHOD FOR SCALABLE TRACE UNIT TIMESTAMPING

(71) Applicant: Qualcomm Incorporated, San Diego, CA (US)

(72) Inventors: Martyn Ryan Shirlen, San Diego, CA (US); Victor Wong, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 86 days.

(21) Appl. No.: 13/964,089

(22) Filed: Aug. 11, 2013

(65) Prior Publication Data

US 2015/0046617 A1 Feb. 12, 2015

(51) Int. Cl.
G06F 9/44 (2006.01)
G06F 13/36 (2006.01)
G06F 11/36 (2006.01)
G06F 11/34 (2006.01)

(52) U.S. Cl.
CPC ............ *G06F 13/36* (2013.01); *G06F 11/3466* (2013.01); *G06F 11/364* (2013.01); *G06F 11/3648* (2013.01)

(58) Field of Classification Search
None
See application file for complete search history.

(56) References Cited

U.S. PATENT DOCUMENTS

| | | | |
|---|---|---|---|
| 6,539,339 B1 * | 3/2003 | Berry et al. ............ 702/186 |
| 6,658,519 B1 | 12/2003 | Broberg, III et al. | |
| 7,274,313 B2 | 9/2007 | Swoboda | |
| 8,407,528 B2 | 3/2013 | Larson | |
| 2006/0168483 A1 * | 7/2006 | Sherlock et al. ........... 714/43 |
| 2006/0259820 A1 * | 11/2006 | Swoboda ................. 714/38 |
| 2008/0120129 A1 * | 5/2008 | Seubert et al. ............ 705/1 |
| 2008/0126877 A1 * | 5/2008 | Alsup ..................... 714/45 |
| 2008/0155345 A1 * | 6/2008 | Edgar et al. ............ 714/43 |
| 2009/0172636 A1 * | 7/2009 | Griffith et al. ........... 717/113 |
| 2011/0219376 A1 | 9/2011 | Williams et al. | |
| 2012/0110387 A1 * | 5/2012 | Horley et al. ........... 714/45 |
| 2012/0226837 A1 | 9/2012 | Cruickshank et al. | |
| 2012/0260344 A1 * | 10/2012 | Maor et al. ............ 726/25 |
| 2013/0159780 A1 | 6/2013 | Bedwell et al. | |
| 2014/0040550 A1 * | 2/2014 | Nale et al. ............ 711/118 |
| 2014/0215443 A1 * | 7/2014 | Voccio et al. ........... 717/128 |
| 2014/0325494 A1 * | 10/2014 | Brown et al. ........... 717/149 |
| 2015/0095578 A1 * | 4/2015 | Doshi et al. ........... 711/125 |

FOREIGN PATENT DOCUMENTS

GB 2478328 A 9/2011

OTHER PUBLICATIONS

International Search Report and Written Opinion—PCT/US2014/050461—ISA/EPO—Nov. 17, 2014.

\* cited by examiner

*Primary Examiner* — Chameli Das
(74) *Attorney, Agent, or Firm* — Smith Risley Tempel Santos LLC

(57) ABSTRACT

An integrated circuit includes a trace subsystem that provides timestamps for events occurring in a trace source that does not natively support time stamping trace data. A timestamp inserter is coupled to such a trace source. The timestamp inserter generates a modified trace data stream by arranging a reference or references with the trace information from the trace source on a trace bus. A trace destination receives the modified trace data stream including the reference(s). In some embodiments, a timestamp inserter receives a timestamp request and stores a reference in a buffer. Upon later receipt of trace information associated with the request, the timestamp inserter inserts the reference, a current reference and the received trace information into the trace data stream.

14 Claims, 7 Drawing Sheets

SYSTEM AND METHOD FOR SCALABLE TRACE UNIT TIMESTAMPING

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of enabling and supporting cellular telephone calls and the peripheral functions of a still camera, a video camera, a music player, global positioning system (GPS) navigation, web browsing, sending and receiving emails, sending and receiving text messages, push-to-talk capabilities, etc.

One design approach, typically used in developing PCDs, assigns separate teams and sometimes whole organizations to develop integrated circuits to support various functions. A system-on-chip ("SoC") in a PCD may include multiple general-purpose processing cores, digital signal processors ("DSPs"), and various additional specialized circuit elements for process acceleration and/or input/output ("I/O") device communication, among other functions. As new functions are added to each subsequent SoC design, the complexity associated with integrating and coordinating the operation of the various component ICs becomes more complex.

It is well known that the desired operational performance, usability and market success of a PCD are directly determined by the software that is developed to run on the programmable sub-systems of the PCD. Therefore, system trace and debugging systems have been developed to expose various characteristics of the operation of the system to the software and hardware development teams. Such embedded trace systems include a number of SoC peripherals such as cells or circuit modules for processing and buffering trace data. Some of these SoC peripherals insert a timestamp into a trace data stream. These conventional time stamping techniques have included the insertion of a timestamp in a native trace packet layer that corresponds to the trace protocol being used by the trace source. A native trace packet layer includes a set of packet-based protocols for tracing the operation of various hardware cores. Each packet-based trace protocol is able to differentiate between trace sources, recognize instructions, arguments, timestamps (when supported), and other performance monitoring data, etc.) Trace sources that support the insertion of a timestamp include the Acorn reduced instruction set computer machine embedded trace macrocell architecture (ARM ETM), ARM program flow trace architecture (ARM PFT), among others.

This technique works sufficiently well for proprietary processor and other IC developers that support packet-layer trace protocols in their IC designs. However, many proprietary functional IC blocks include trace units that not only do not support the insertion of a timestamp in the trace data that they generate but contractually forbid their customers from modifying the underlying circuit design.

SUMMARY

Embodiments of systems and methods for providing timestamps from sources that do not natively support time stamping trace data are disclosed. A timestamp insertion element or timestamp inserter is arranged as desired between one or more trace sources and one or more trace sinks or trace data destinations. The timestamp inserter modifies a trace data stream that is communicated along a trace data bus. In various example embodiments, the timestamp inserter is responsive to one or more of a system clock, an output signal from an embedded cross-trigger element, or indications of one or more events from a trace source. A timestamp correction algorithm supplements a trace parser by determining the time between when a timestamp identifier was requested and when the timestamp is inserted in the trace data stream. The timestamp correction algorithm can also be deployed at various locations along the trace bus to correct a forwarded or outgoing timestamp on its next destination in the trace architecture.

In an exemplary embodiment, a system-on-chip (SoC) includes a timestamp inserter coupled to the trace source and a trace destination. The timestamp inserter generates a modified trace data stream in accordance with a reference and information from the trace source.

In an alternative embodiment, a method for providing timestamps from trace sources that do not natively support time stamping trace data includes the steps of locating a timestamp inserter along a bus between one or more trace sources that use a protocol that does not support a timestamp and one or more trace destinations, receiving an indication of an operational condition, communicating a timestamp request identifier in response to the detecting, using the timestamp inserter to place a first reference in a first-in first-out buffer and upon receipt of trace information associated with the timestamp request identifier, forwarding from the timestamp inserter the first reference, a current reference and the trace information on the bus.

In still another embodiment, a computer program product stored in a non-transitory computer readable medium having computer readable program code is provided. The computer readable program code includes first logic and second logic. The first logic directs a processor to read a trace data stream. The trace data stream includes a first reference responsive to a condition. The first logic further directs a processor to locate a second reference and trace information associated with the second reference in the trace data. Both the first reference and the second reference are responsive to a trace source that does not support timestamps. The second logic directs a processor to generate a modified trace data stream with a time adjustment in response to the first reference and the second reference.

BRIEF DESCRIPTION OF THE DRAWINGS

The systems and methods for providing timestamps from sources that do not natively support time stamping trace data can be better understood with reference to the following figures. The components within the figures are not necessarily to scale, emphasis instead being placed upon clearly illustrating the principles of controllably modifying a trace data stream. Moreover, in the figures, like reference numerals designate corresponding parts throughout the different views unless otherwise indicated.

For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

In this description, the term "portable computing device" ("PCD") is used to describe any computing device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a personal digital assistant or PDA, a smartphone, a navigation device, a smart book or reader, a media player, a combination of the aforementioned devices, or a laptop computer with a wireless connection, among others.

In this description, the term "application" or "application program" may include files having executable content, such as object code, scripts, byte code, markup language files, and patches. In addition, an "application" or "application program" referred to herein may also include files that are not executable in nature, such as documents that may need to be opened or other data files that need to be accessed.

As used in this description, the terms "component," "database," "module," "system," "processing component," and the like are intended to refer to a computer-related entity, either in the form of hardware, firmware, a combination of hardware and software, software, or software in execution. For example, a component may be, but is not limited to being, a process running on a processor, a processor, an object (e.g., data, programmable configuration information), an executable statement, a thread of execution, a program, a script and/or a computer. One or more components may reside within a process and/or thread of execution, and a component may be localized on one processor and/or distributed between two or more processors. Similarly, a component may be localized to one computer and/or distributed between two or more computers. In addition, these components may execute from various computer-readable media having various logic or data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In addition, the term "processor," as that term is used herein, is also intended to denote computational devices that perform functions in hardware, such as state machines embedded in ICs.

Figure 1:
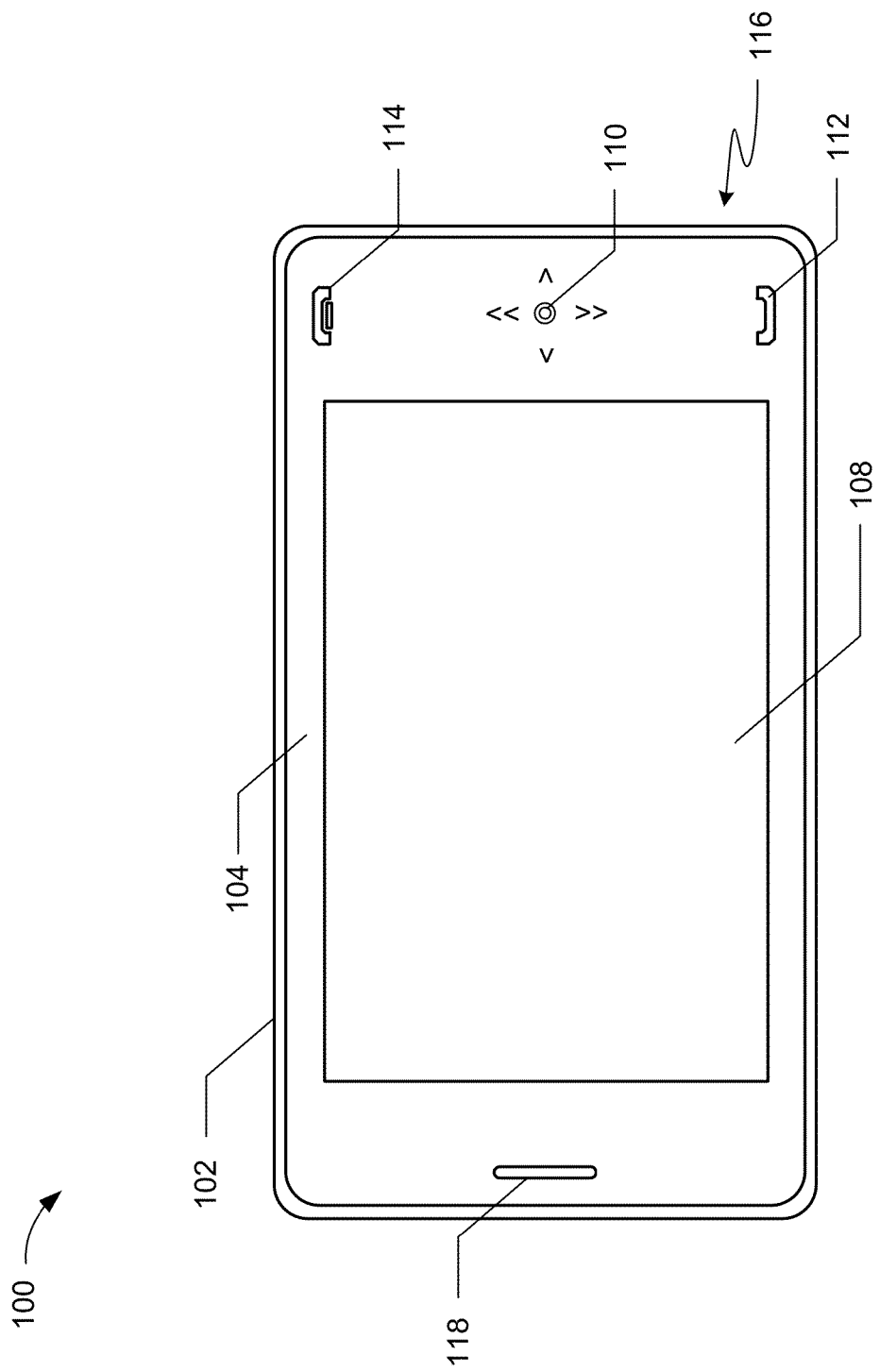
FIG. 1 is a schematic diagram illustrating an example embodiment of a portable computing device (PCD).
Figure 2:
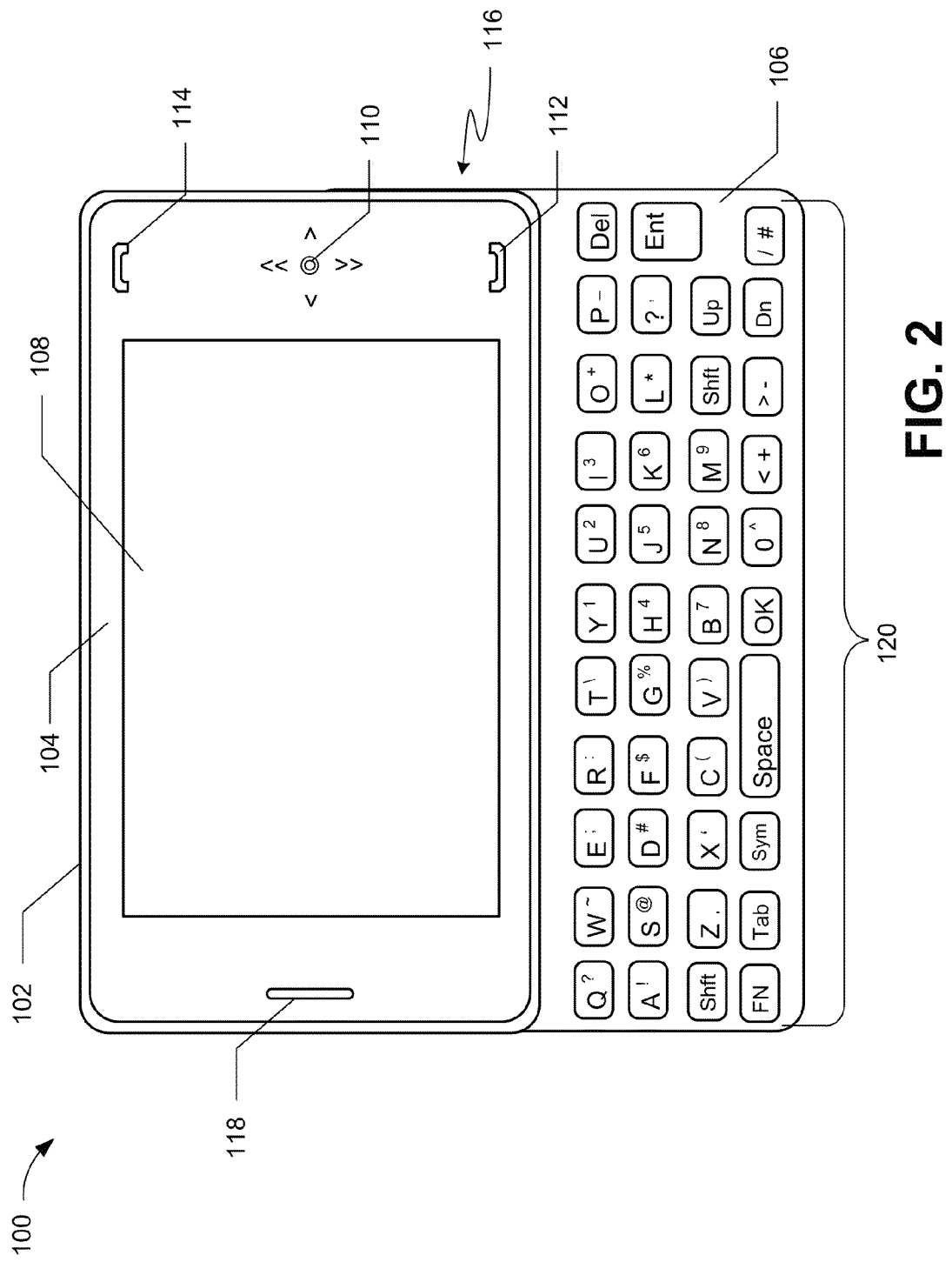
FIG. 2 is schematic diagram illustrating an example aspect of the PCD of FIG. 1.

Referring initially to FIG. 1 and FIG. 2, an exemplary portable computing device (PCD) 100 is shown. The PCD 100 includes a housing 102. The housing 102 has an upper housing portion 104 and a lower housing portion 106. FIG. 1 shows that the upper housing portion 104 may include a display 108. In a particular aspect, the display 108 may be a touch screen display. The upper housing portion 104 includes a trackball input device 110. Further, as shown in FIG. 1, the upper housing portion 104 includes a power on button 112 and a power off button 114, a speaker 118 and a microphone 116. In an alternative embodiment (not shown) a single pushbutton may be arranged to enable a power on mode and thereafter a power off mode. Additional pushbutton(s) may be provided to control operation of various subsystems arranged within the housing 102. For example, the PCD 100 may be arranged with a pushbutton (not shown) to answer a phone call communicated to the PCD by a cellular service provider.

In a particular aspect, as depicted in FIG. 2, the upper housing portion 104 is movable relative to the lower housing portion 106. Specifically, the upper housing portion 104 may be moved by a sliding movement or action relative to the lower housing portion 106. As shown in FIG. 2, the lower housing portion 106 includes a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106.

Figure 3:
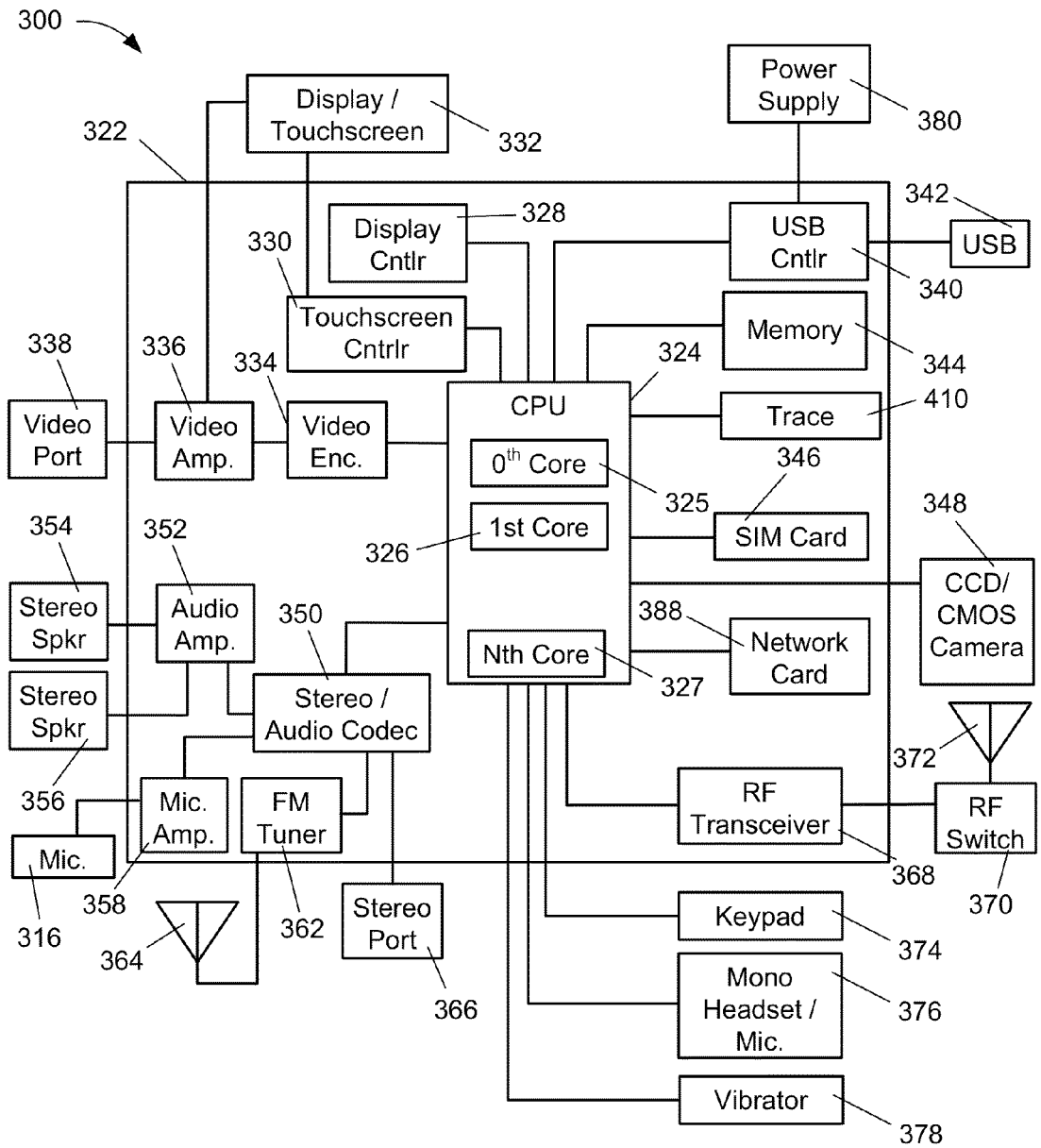
FIG. 3 is a block diagram of a second example aspect of the PCD of FIG. 1.

Referring to FIG. 3, an exemplary, non-limiting aspect of a portable computing device (PCD) is shown and is generally designated 300. As shown, the PCD 300 includes an on-chip system or SoC 322 that includes a multicore CPU 324. The multicore CPU 324 includes a zero$^{th}$ core 325, a 1$^{st}$ or first core 326, and an N$^{th}$ core 327.

As illustrated in FIG. 3, a display controller 328 and a touch screen controller 330 are coupled to the multicore CPU 324. In turn, display/touchscreen 332, external to the on-chip system 322, is coupled to the display controller 328 and the touch screen controller 330.

FIG. 3 further indicates that a video encoder 334, e.g., a phase alternating line (PAL) encoder, a séquentielcouleur à mémoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may be coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 316 may be coupled to the microphone amplifier 358. In a particular aspect, a frequency modulation (FM) radio tuner 362 may be coupled to the stereo audio CODEC 350. Also, a FM antenna 364 is coupled to the FM radio tuner 362. Further, a stereo port 366 may also be coupled to the stereo audio CODEC 350.

FIG. 3 further indicates that a radio frequency (RF) transceiver 368 is coupled to the multicore CPU 324. An RF switch 370 may be coupled to the RF transceiver 368 and an RF antenna 372. As shown in FIG. 3, a keypad 374 is coupled to the multicore CPU 324. Also, a monaural or mono headset with a microphone 376 may be coupled to the multicore CPU 324. Further, a vibrator device 378 may be coupled to the multicore CPU 324. FIG. 3 also shows that a power supply 380 may be coupled to the on-chip system 322 via the USB controller 340. In a particular aspect, the power supply 380 is a direct current (DC) power supply that provides power to the various components of the PCD 300 that require power. Further, in a particular aspect, the power supply is a rechargeable DC battery or a DC power supply that is derived from an alternating current (AC) to DC transformer that is connected to an AC power source.

FIG. 3 further indicates that the PCD 300 may also include a network card 388 that may be used to access a data network, e.g., a local area network, a personal area network, or any other network. The network card 388 may be a Bluetooth network card, a WiFi network card, a personal area network (PAN) card, or any other network card well known in the art. Further, the network card 388 may be incorporated in an integrated circuit. That is, the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 316, the FM antenna 364, the stereo port 366, the RF switch 370, the RF antenna 372, the keypad 374, the mono headset 376, the vibrator 378, and the power supply 380 are external to the on-chip system or SoC 322.

RF transceiver 368, which may include one or more modems, may support one or more of global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE and PDD/LTE wireless protocols.

As further indicated in FIG. 3, the SoC 322 includes a trace subsystem 410. In the illustrated embodiment, the trace subsystem 410 is coupled to the multicore CPU 324. It should be understood that the trace subsystem 410 may include a host of distributed trace sources such as one or hardware core trace units connected to a trace bus. The trace bus may further include various buffers distributed across the SoC 322. Some trace buffers may be located between a trace source and a trace destination or sink. As described in further detail in association with the description of embodiments illustrated in FIGS. 4-7, for trace sources that do not natively support a timestamp, a timestamp inserter is placed along the trace bus between such trace sources and one or more trace destinations.

A trace source is a SoC integrated element that generates at least one data signal indicative of an event or condition. Example trace sources may include elements that monitor one or more environmental conditions and may further include processing units, trace managers, memory controllers and other SoC circuit elements capable of generating trace data without a timestamp. Trace sources may produce trace data using any number of trace data protocols.

A trace destination is any element that buffers or stores trace data. A trace destination may be located within the same system as the trace source and the trace bus or may be located in an external system. That is, when the trace source and the trace bus are located on a SoC, the trace destination may be located on or off the SoC 322. For example, trace destinations may include pipeline buffers on the trace bus, embedded on-chip buffers indirectly coupled to the trace bus, a trace port interface unit for communicating trace data to an off SoC data storage device, an external data storage device, among others.

The timestamp inserter receives one or more indications that a timestamp is desired and in response generates a modified trace data stream that includes a reference responsive to the timestamp request and a second reference indicative of the trace data associated with the timestamp request. The timestamp inserter is configured to augment by adding the reference responsive to the timestamp request, the second reference and the associated trace data in a trace data stream consisting of more than one interleaved trace streams. In some trace protocols, a previously unused identifier can be used as a timestamp identifier. In other trace protocols, a unique string can be used as a timestamp identifier.

As will be explained in greater detail, a corrective algorithm may be applied at the trace destination to account for delays between the timestamp request and a later introduction of the trace data responsive to the timestamp request into the modified trace data stream. When the trace destination is a buffer arranged along the trace bus, a corrective circuit may be arranged in communication with a timestamp inserter to generate a time corrected timestamp. Alternatively, the corrective circuit may be embedded or integrated with the timestamp inserter. In still other arrangements, such as when the trace destination is an external data storage device, the corrective algorithm may be stored in a memory element accessible by a processor provided to execute one or more trace analysis programs.

The timestamp inserter augments or functions in conjunction with a trace data formatter. Trace data formatters recognize supported trace data sources and interleave the various trace data streams. The inserter may use a reserved or unused identifier from a known trace protocol to identify a timestamp request. In such an arrangement the timestamp request is interleaved with other trace data in a trace data stream. Alternatively, an inserter may be arranged to use a new identifier to communicate a timestamp request. In either implementation, a trace data analysis tool or debugger will be arranged to recognize the identifier(s) and the related trace data.

Timestamps can be inserted in response to multiple signals. For example, timestamps may be generated periodically under the direction of a programmable counter coupled to a system clock signal. By way of further example, timestamp requests can be responsive to cross trigger events received from an embedded cross trigger element. Such cross trigger elements, pass debug events from a first processor to a second processor, thus allowing a trace controller to stop program execution on both processors simultaneously, if so required.

In addition, timestamps may be generated in response to the receipt of various hardware event signals from a trace source. For example, some CPUs are configured with a general purpose output port or a set of output ports that can be actively directed to apply a signal or signals responsive to an operating condition such as an executed instruction being within a predetermined address range. The one or more signals can be forwarded to a timestamp inserter or other downstream logic circuits to insert a timestamp as the signals transition in a desired way. Thus, the timestamp inserter can be arranged to respond to any combination of periodic signals, cross trigger events, and hardware events from trace units, as may be desired.

In a particular aspect, multiple instances of a timestamp inserter can be integrated to form a modified trace data aggregator. Such an arrangement leads to a degree of bandwidth conservation and is thus a desirable mechanism to integrate timestamps with trace data from trace sources requiring timestamp adjustment. Whether implemented as a single timestamp inserter or in a tandem or parallel arrangement in an aggregator, the timestamp inserter provides information that can be used to adjust or manipulate relative timing to compensate for delays introduced by buffers.

When a timestamp request is indicated, the timestamp inserter forwards a current reference into a first-in first-out buffer. The current reference may be in the form of a programmable counter coupled to a system clock signal. When the trace data arrives at the timestamp inserter it is marked or tagged with an identifier that indicates to the timestamp inserter that the trace data is in fulfillment of the earlier received request for a time stamp. Upon arrival of the trace data, the timestamp inserter is arranged to retrieve and insert the first or request reference value along with a second or present reference value and the trace data into the trace data stream.

When modified as described, the trace data can be used to remove the timing delay or timing error that would otherwise accumulate as trace data is buffered and communicated along the trace bus. Such timing delays or timing errors are present in SoCs with trace data buffers. For example, the trace subsystem 410 may comprise many pipelined buffers, which will store and forward the trace data at significantly slower rates than the events triggering the requests. Under these circumstances, an embedded trace source associated with the CPU or processing core generates a hardware event that is desired to be monitored via the trace subsystem 410, it will be appreciated that the trace bus may receive the trace data after a significant amount of time has elapsed (i.e., in some cases many clock cycles after the timestamp request). By marking the trace data with a first reference associated the request and a second reference when the trace data arrives, a data analysis tool can be arranged with an algorithm to correct or adjust the timestamp or the described corrective circuit can be arranged with the timestamp inserter to adjust the trace data before forwarding the same to a buffer or other trace destination.

Additional timing errors may be introduced when trace sources operate at a first frequency and trace bus elements operate at a second frequency different than the first frequency. In most SoC designs, processing resources will generally operate at clock frequencies that may be an order of magnitude or more different from the trace bus clock frequency. For example, a central processing unit or processing core may be operated at a clock frequency in excess of 3 GHz, whereas a trace system bus may operate at about 200 to 300 MHz.

Figure 4:
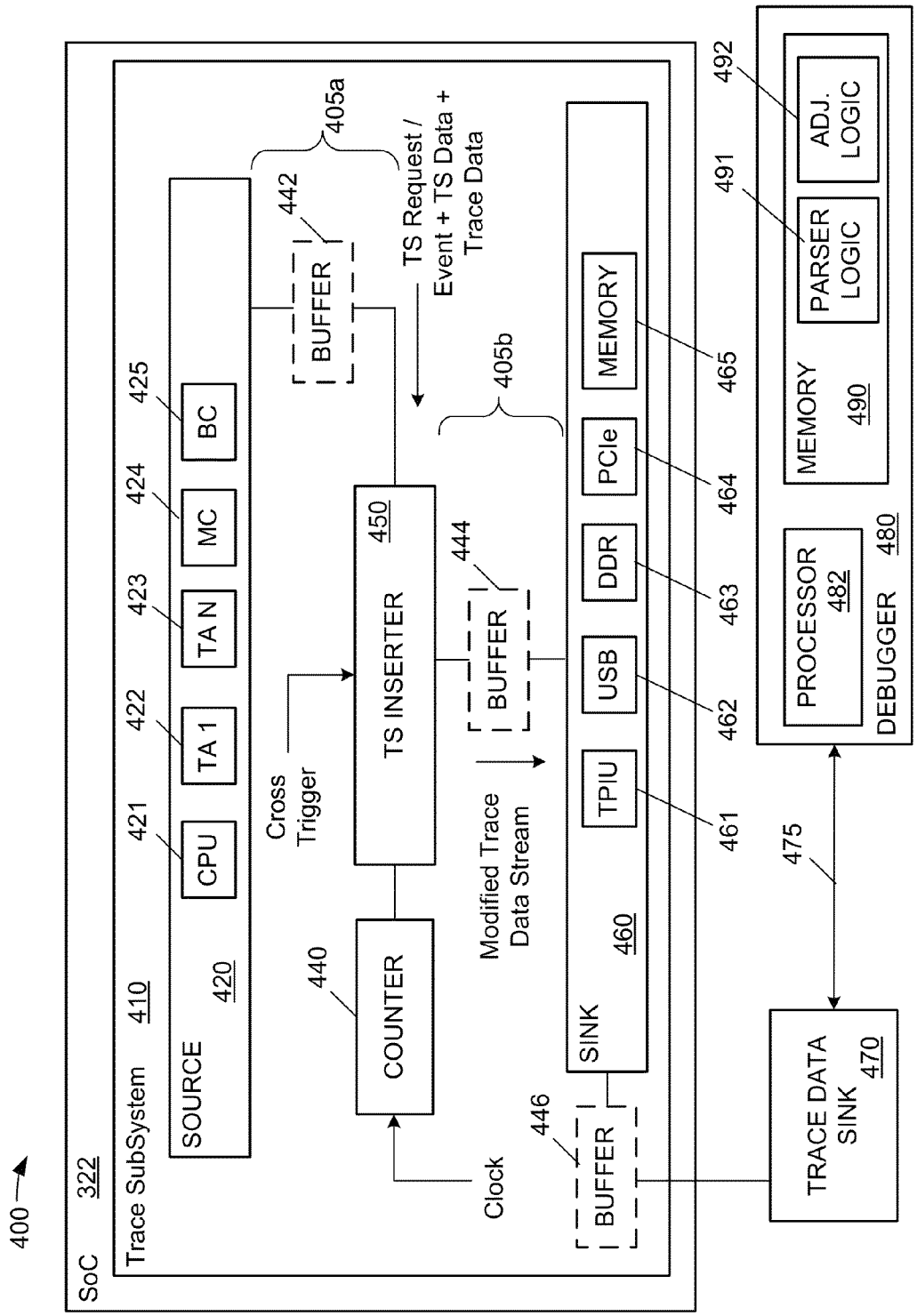
FIG. 4 is a schematic diagram illustrating an example embodiment of the trace subsystem of FIG. 3.

FIG. 4 is a schematic diagram illustrating an example embodiment of the trace subsystem 410 of FIG. 3. In the illustrated embodiment, the trace subsystem 410 resides on a SoC 322 and includes at least one source 420, a timestamp inserter 450 and a sink 460. The timestamp inserter 450 receives a reference in the form of an output from a counter 440 that is coupled to a system clock signal. The timestamp inserter 450 also receives one or more indications of cross trigger events from one or more embedded cross trigger systems. Cross trigger events permit a debug system to pass information from one CPU or processing core to another CPU or processing core. An embedded cross trigger system further provides a scalable interface between the supported CPUs and a trace bus. In addition, the timestamp inserter 450 is communicatively coupled to the source 420 via a portion trace bus 405*a*, which may include one or more trace buffers 442 as required to accurately forward trace data.

Source 420 generates at least one data signal indicative of an event or condition. An example event includes the start of a routing layer trace data packet or a series of packets. Such packets are further described in association with the system illustrated in FIG. 5. The data signal communicating the trace information is issued in accordance with a trace protocol that does not support a timestamp. Example trace data sources may include elements that monitor one or more environmental conditions and may further include processing units such as CPU 421, system trace agent (TA1) 422, system trace agent (TAN) 423, memory controller 424, bus controller 425, or hardware accelerators (not shown) capable of generating trace data but not arranged to support the entry of a timestamp in the trace data. It should be understood that trace information issued from trace sources may be communicated using different trace protocols. That is, a first trace source may communicate trace information using a trace protocol that is different from a second trace source using a separate and distinct trace protocol.

The inserter 450 is arranged to interleave and forward the timestamp request identifier along with a related identifier that identifies trace data as being associated with or in fulfillment of the timestamp request. As indicated, the timestamp identifier can be a previously unused identifier or another unique data string that can be identified in a by logic circuits in or coupled to a downstream element in the trace subsystem 410. The inserter 450 is arranged to respond to one or more of the counter signal (i.e., a time-varying reference), a cross trigger event, or an event from a trace data source by modifying the trace data to include one or more references or timestamps and timestamp related trace data. Thereafter, the modified trace data, including one or more timestamps responsive to trace sources or other elements that do not natively support timestamps is communicated along trace bus portion 405*b* to the sink 460. Similar to trace bus portion 405*a*, trace bus portion 405*b* may include one or more buffers 444 as may be required to accurately communicate the modified trace data from the inserter 450 to the sink 460.

Example trace sinks include an Acorn reduced instruction set computer machine trace protocol interface unit (or ARM TPIU) 461, a universal serial bus (USB) 462, a double-data rate (DDR) bus 463, a peripheral component interconnect express (PCIe) interface 464 and a memory element 465. While specific example trace sinks are illustrated in FIG. 4, it should be understood that any downstream element along the trace bus 405*b* or external communication links that can hold the modified trace data stream is a trace destination or sink. Accordingly, trace sinks may be collocated on the SoC 322 or may be external devices such as external trace data sink 470 and debugger 480.

In the illustrated arrangement, the external data sink 470 is a data storage device capable of storing the modified trace data stream communicated from the SoC 322. In an example arrangement, the buffer 446 is a universal serial bus controller and the external data sink is a hard disk drive coupled to the debugger via connection 475.

The debugger 480 is a general purpose electronic device including at least one processor 482 communicatively coupled to a memory 490. The debugger 480 further includes one or more network or data interfaces (not shown) to support the connection 475 to the external data sink 470. In addition, the debugger 480 may be arranged with one or more input/output devices (not shown) to support communication with an operator. In accordance with parser logic 491 stored in the memory 490 and executed by the processor 482, the debugger 480 reads a modified trace data stream including a first timestamp responsive to a condition on an integrated circuit based system such as the SoC 322. In addition, the debugger 480 locates or identifies a second timestamp and trace information associated with the second timestamp. Once the parser logic 491 has identified these items in the modified trace data stream, the adjustment or correction logic 492, stored in the memory 490 and executed by the processor 482, directs the debugger 480 to generate a corrected timestamp in response to a difference in time between the first timestamp or reference and a second timestamp or reference. As indicated, the first reference represents a moment in time when the event triggering a request or the request is identified by the inserter 450 whereas the second reference represents a moment in time when the inserter 450 receives the trace data that is to be marked with a timestamp.

The debugger 480 further includes a local interface (not shown) which communicatively couples the processor 482 and the memory 490 to each other and to the network and operator interfaces. The local interface generally includes one or more buses or other wired connections, as known in the art. The local interface may have additional elements, which are also omitted for simplicity, such as controllers, buffers (caches), drivers, repeaters, and receivers, to enable communications. Further, the local interface may include address, control, power and/or data connections to enable appropriate communications among the aforementioned components. Moreover, the local interface provides power to each of the processor 482, the memory 490, as well as the network and operator interfaces in a manner understood by one of ordinary skill in the art.

The processor 482 is a hardware device for executing software (i.e., programs or sets of executable instructions), particularly those stored in the memory element 490. The processor 482 can be any custom made or commercially available processor, a central processing unit (CPU), an auxiliary processor among several processors associated with the debugger 480, a semiconductor based microprocessor (in the form of a microchip or chip set), or generally any device for executing instructions.

The memory 490 can include any one or combination of volatile memory elements (e.g., random-access memory (RAM), such as dynamic random-access memory (DRAM), static random-access memory (SRAM), synchronous dynamic random-access memory (SDRAM), etc.) and non-volatile memory elements (e.g., read-only memory (ROM), a flash memory module, a hard-disk drive, a solid-state drive, tape, compact disk read-only memory (CD-ROM), etc.). Moreover, the memory 490 may incorporate electronic, magnetic, optical, and/or other types of storage media. Note that the memory 490 can have a distributed architecture, where various components are situated remote from one another, but can be accessed by the processor 482 via the local interface. Disk and disc, as used herein, includes compact disc ("CD"), laser disc, optical disc, digital versatile disc ("DVD"), floppy disk and blu-ray discs where disks usually reproduce data magnetically, while discs reproduce data optically with lasers. Combinations of the above should also be included within the scope of a non-transitory computer-readable media capable of storing one or both of the parser logic 491 and the adjustment logic 492.

The software in the memory 490 may include one or more separate programs, each of which comprises an ordered listing of executable instructions for implementing logical functions. In the example embodiment illustrated in FIG. 4, the software in the memory 490 includes parser logic 491 and adjustment or correction logic 492. In alternative embodiments, the adjustment logic or correction logic 492 may be implemented via one or more distributed computing devices remote from but accessible to the debugger 480 and/or in a circuit or circuits on the SoC 322. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

It should be noted that the combination of one or more of the parser logic 491 and the adjustment logic 492 described above with regard to FIG. 4 or any other such non-transitory computer-readable medium constitutes a "computer program product" as that term is understood in the patent lexicon.

Figure 5:
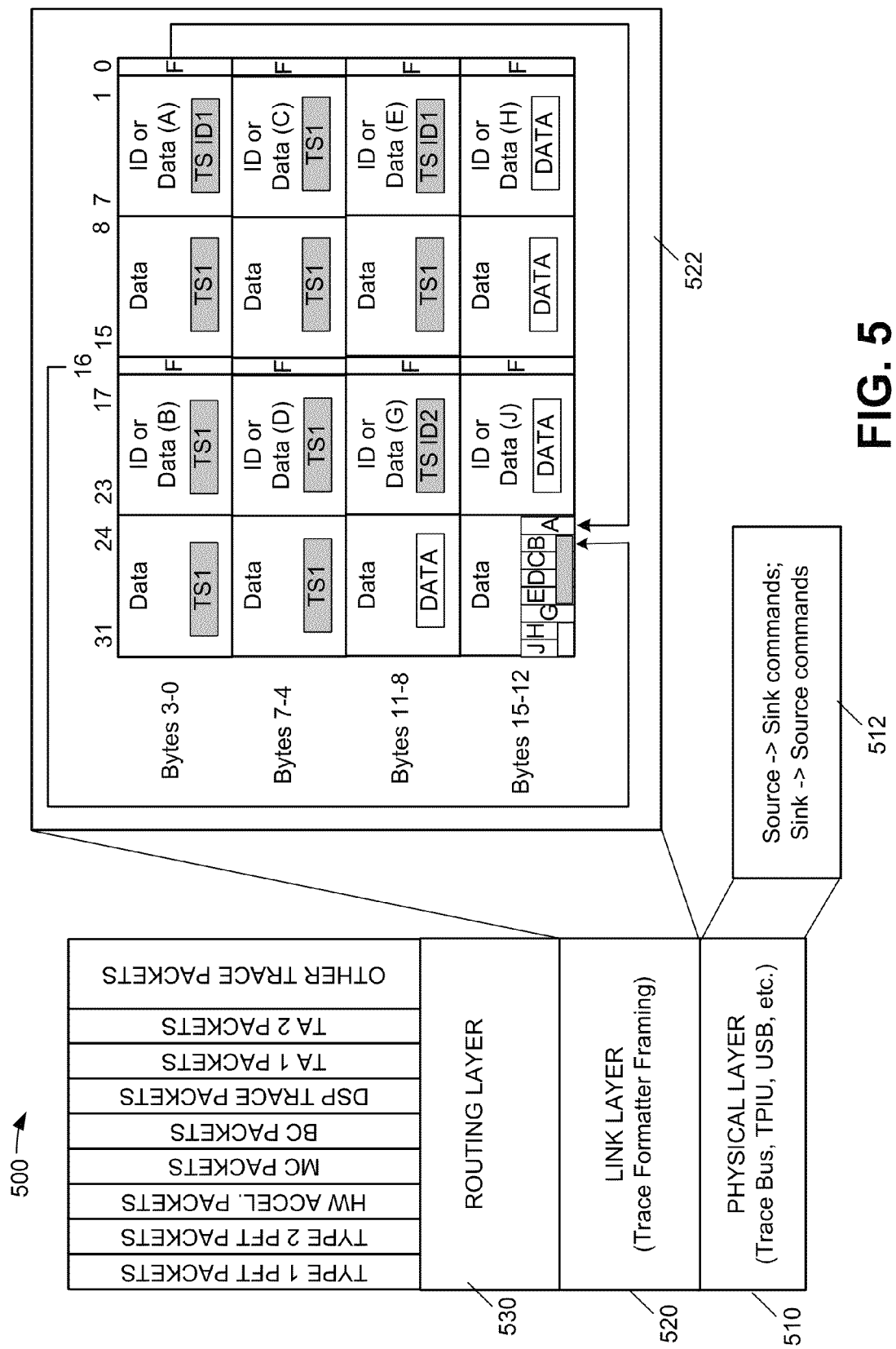
FIG. 5 is a schematic diagram illustrating an example embodiment of a modified trace data stream.

FIG. 5 is a schematic diagram illustrating an example embodiment of a trace system 500 for supporting time stamping from trace units that employ protocols that do not generate timestamps. The example trace system 500 reveals how a formatted frame structure for supporting trace data protocols can be modified by inserting previously unused identifiers and related references and other data from trace sources that do not natively support the entry of timestamps into trace data. Other trace data frame structures can be modified to include timestamps and related data as may be desired.

The trace system 500 can be described as a multiple layer model having a physical layer 510, a link layer 520 and a routing layer 530. As indicated in FIG. 5, the physical layer 510 comprises the circuit elements and conductors that support a trace bus and elements coupled to the trace bus. The physical layer 510 further includes a set of commands 512 that direct the physical layer 510 to operate in a defined ways. As further illustrated in FIG. 5, the set of commands includes both source-to-sink commands and sink-to-source commands. Source to sink commands may include defined trace source identifiers, and various signals to identify trace data, how many bytes of trace data will be provided, data validity and when the sink is ready to receive the data. Sink to source commands may include a trace infrastructure flush request, an acknowledgement or other indication that the sink is ready to receive data, etc.

The routing layer 530 communicates packets of trace data arranged in accordance with various trace data protocols. In the illustrated embodiment, trace sources generate and communicate trace data packets using any of a number of separate and distinct trace protocols. These may include known trace protocols supported by microprocessors designed with an advanced reduced instruction set architecture, among others.

The link layer 520, which resides between the routing layer 530 and the physical layer 510, performs the task of interleaving and formatting the trace data provided by the trace sources. A 16-byte trace data frame is representative of a portion of a trace data stream generated by a conventional frame formatter using a known trace data protocol. The example data frame is included to show how a known trace data formatter (e.g., an ARM® CoreSight frame formatter) can be augmented with signaling information from a timestamp inserter to include timestamps from trace sources that do not natively support the introduction of a timestamp in trace data at the link layer 520. ARM® is a registered trademark of ARM Limited Company of Cambridge, United Kingdom.

Each 16-byte data frame includes seven bytes that always include data, eight bytes that include trace identifiers or data and a byte of auxiliary bits that indicate whether a corresponding one of the eight bytes was filled with data or a new identifier. A bit located adjacent and preceding the eight bytes that include data or an identifier is used to identify whether the subsequent byte includes an identifier or data. The multiple use bytes (those that support identifiers or data) are arranged in bits 1-7 and 17-23 or byte 0 and the even numbered bytes thereafter across the 16 byte data frame. When byte 0 and the even numbered bytes include an identifier, the bytes that follow will be populated with references and related data that changed as a result of the triggering condition.

In the illustrated embodiment, timestamp identifiers and associated data replaces the entry of conventional trace data from the trace bus. The timestamp inserter 450 will include control logic to interrupt the flow of trace data from the data formatter. The timestamp identifier can be any previously unused arrangement of bits that form a unique byte. As described, a previously reserved identifier from a trace data protocol can be adopted for use as a timestamp identifier. Alternatively, other unique bytes could be used to signal a data formatter or timestamp inserter. Thereafter, the timestamp related data is registered in the trace data frame in accordance with data formatting for the unmodified trace data protocol. For the illustrated data frame, this includes inserting a logic "0" at the bit locations labeled "16" and "0" as necessary to convey the related timestamp data. Once all the bytes of the timestamp are communicated from the timestamp inserter to the data formatter, the frame is available for the insertion of a second timestamp from the same trace source or a second timestamp from another trace source different from the first trace source. Each timestamp request is separately distinguishable by the combination of the timestamp identifier and a reference. The data that arrives on the trace bus in fulfillment of the timestamp request is identified by a corresponding indicator that identifies the data that follows is related to the timestamp request. When no additional timestamps requests are available at the timestamp inserter, the data formatter is signaled to process conventional trace data.

An example modified trace data stream 522 includes a timestamp identifier TS ID1, which is inserted in the first of the two bytes or slots (bits 1-7) of a trace data frame. Time stamp related information such as the first and second references and data that changed as a result of the event or condition that triggered the timestamp request follows in the subsequent 7 bytes. A second instance of the timestamp identifier TS ID1 representing a separate timestamp request from the same trace source is inserted in bits 1-7 of byte 8 labeled ID or Data (E). Additional data associated with the timestamp second timestamp request follows in byte 9. A second timestamp identifier TS ID2, which represents a timestamp request from a different trace source than that identified by TS ID1, is inserted in byte 10 and timestamp related data associated with the TS ID2 follows in bytes 11-14.

As indicated above, the auxiliary bits in byte 15 indicate whether identifiers or data are present in the multiple use bytes of the data frame. In the example embodiment, the first timestamp identifier TS ID1 relates to a first trace source and the second timestamp identifier TS ID2 relates to a second trace source different from the first trace source. As long as timestamp identifiers are distinguishable from trace source identifiers used by the one or more trace data protocols supported on the SoC, the above-described convention can be implemented to insert timestamp data into a trace data frame. A change in a timestamp identifier from a first timestamp identifier to a different timestamp identifier indicates that a corresponding trace source has timestamp related data to replace conventional trace data. A parser in a trace data analysis tool such as the debugger 480 (FIG. 4) and or parsing logic circuits coupled to downstream elements in the trace subsystem 410 can be arranged to identify matches with timestamp identifiers inserted in the trace data stream. Thus, the debugger 480 or these downstream trace subsystem elements can identify when timestamps have been inserted into the interleaved trace data.

Alternative data frame arrangements including a total frame count of less, more or the same number of bytes of information are possible and can be similarly augmented or modified to include timestamps. In addition, alternative sequences or arrangements of signaling information to identify timestamp identifiers or trace data may be implemented within the general architecture of a trace data protocol.

Figure 6:
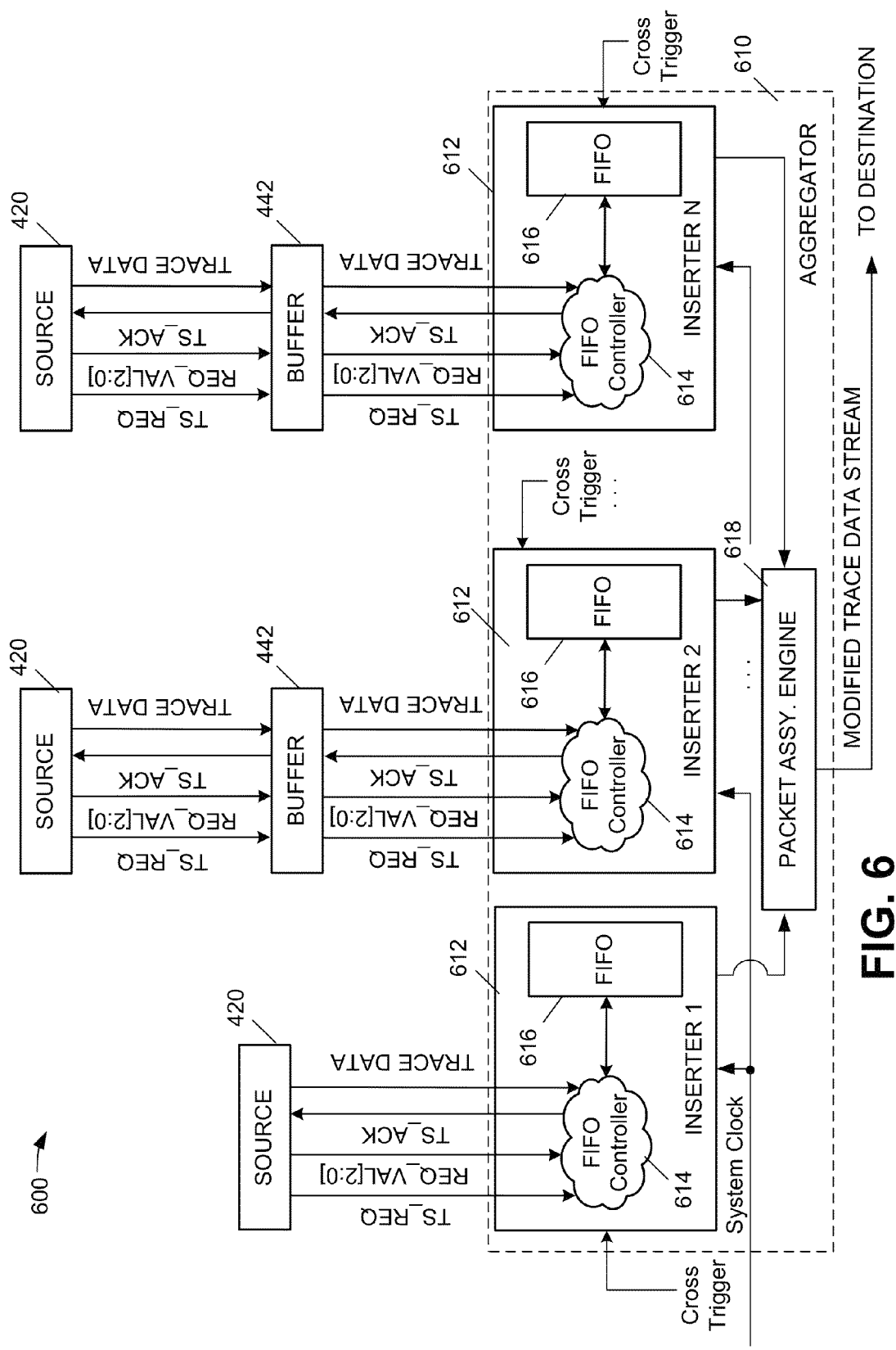
FIG. 6 is a schematic diagram illustrating an alternative embodiment of a trace subsystem.

FIG. 6 is a schematic diagram illustrating an alternative embodiment of a trace subsystem 600. The trace subsystem 600 illustrates aggregation and packetization or the assembly of trace packets using one or more trace protocols to generate modified trace data at the native trace packet layer. In the illustrated embodiment, the trace subsystem 600 includes multiple trace sources 420 each communicatively coupled via control and data connections to an aggregator 610. The aggregator 610 includes multiple inserters 612 and a packet assembly engine 618. As indicated in FIG. 6, the aggregator 610 may include N inserters 612 where N is an integer. Although shown with at least three inserters 612, other embodiments of an aggregator may include two inserters 612 or more than three inserters 612.

As illustrated, the N inserters 612 are arranged substantially in parallel with each other. Each of the inserters 612 receives a system clock signal. As described, the system clock signal can be coupled to an input of a counter to provide a periodic signal or reference value to each of the inserters 612. When so desired, the inserters 612 may respond directly to the system clock and/or the output of a counter (not shown) coupled to the system clock to insert a timestamp in a trace data stream.

Each of the inserters 612 also receives one or more indications of cross trigger events from one or more embedded cross trigger systems (not shown). Cross trigger events permit a debug system to pass information from one CPU or processing core to another CPU or processing core. An embedded cross trigger system further provides a scalable interface between the supported CPUs and a trace bus. In addition, each of the inserters 612 is communicatively coupled to a respective trace data source or source 420 via a corresponding control and data bus. As indicated in FIG. 6, a buffer 442 may be inserted along the trace control and data bus between the trace source 420 and the respective inserters 612 in the aggregator 610. Although only a single buffer 442 is shown in the trace bus coupled to two of the N inserters 612, it should be understood that one or more additional buffers 442 can be inserted as may be required to accurately communicate the trace control and data signals between a particular trace source 420 and a particular inserter 612.

As shown in the example embodiment, a timestamp request is communicated along the trace control bus from the respective source 420 to the corresponding inserter 612. When the timestamp request is detected by a FIFO controller 614, the inserter 612 inserts a first current value responsive to the reference (e.g., a counter output derived from the system clock) into a first-in first-out buffer 616. Thereafter, FIFO controller 614 or other bus control logic circuits in the inserter 612 communicate a timestamp acknowledgement signal along the trace control bus to the source 420. After some period of time, the trace data associated with the timestamp request arrives at the FIFO controller 614 along with an identifier that the FIFO controller 614 uses to associate the trace data with the earlier received timestamp request. In response, the FIFO controller 614 will retrieve the reference associated with the timestamp request and insert a second current value with the identifier and the trace information into a serial data stream that is communicated to the packet assembly engine 618.

Alternatively, the FIFO controller 614 or other logic circuits in the inserter 612 may include timestamp request logic responsive to a cross trigger event only or a combination of one or more of an event that occurs in the trace source 420 and an interaction between a paired system trace agent and a processing core (i.e., a cross trigger event). In response to such initiating signals, the timestamp request logic inserts a reference in the FIFO 616. When data associated the timestamp request arrives from the source 420 and/or from the cross trigger input, the inserter 612 retrieves the reference associated with the timestamp request and inserts a second reference value or current reference value with the identifier and the trace information into the trace data stream, which is communicated along a trace bus to a destination such as a trace sink.

The packet assembly engine 618 is arranged to receive timestamp related data from each of the N inserters 612. In turn, the packet assembly engine 618 is arranged to interleave and forward the trace data it receives from each of the respective sources 420 via the inserters 612. Accordingly, the packet assembly engine 618 may be arranged with logic for prioritizing trace data from one or more sources 420 and/or trace data communicated in a particular trace data protocol. In addition, the packet assembly engine 618 may apply arbitration logic in an effort to control the prioritization of timestamp and trace data from the coupled trace sources 420. Such prioritization and/or centralized aggregation may be responsive to what various trace subsystem units are presently doing (e.g., branching, fetching, retiring instructions, etc.), which could lead to a degree of trace data bandwidth conservation as may be desired. In this regard, the aggregator 610 will coordinate the activities of the N inserters 612 such that the respective FIFOs 616 are not overrun with trace data. Stated another way, the aggregator 610 may include logic to suspend the storage of trace data to permit sufficient time to insert the timestamp identifiers in the modified trace data stream.

Figure 7:
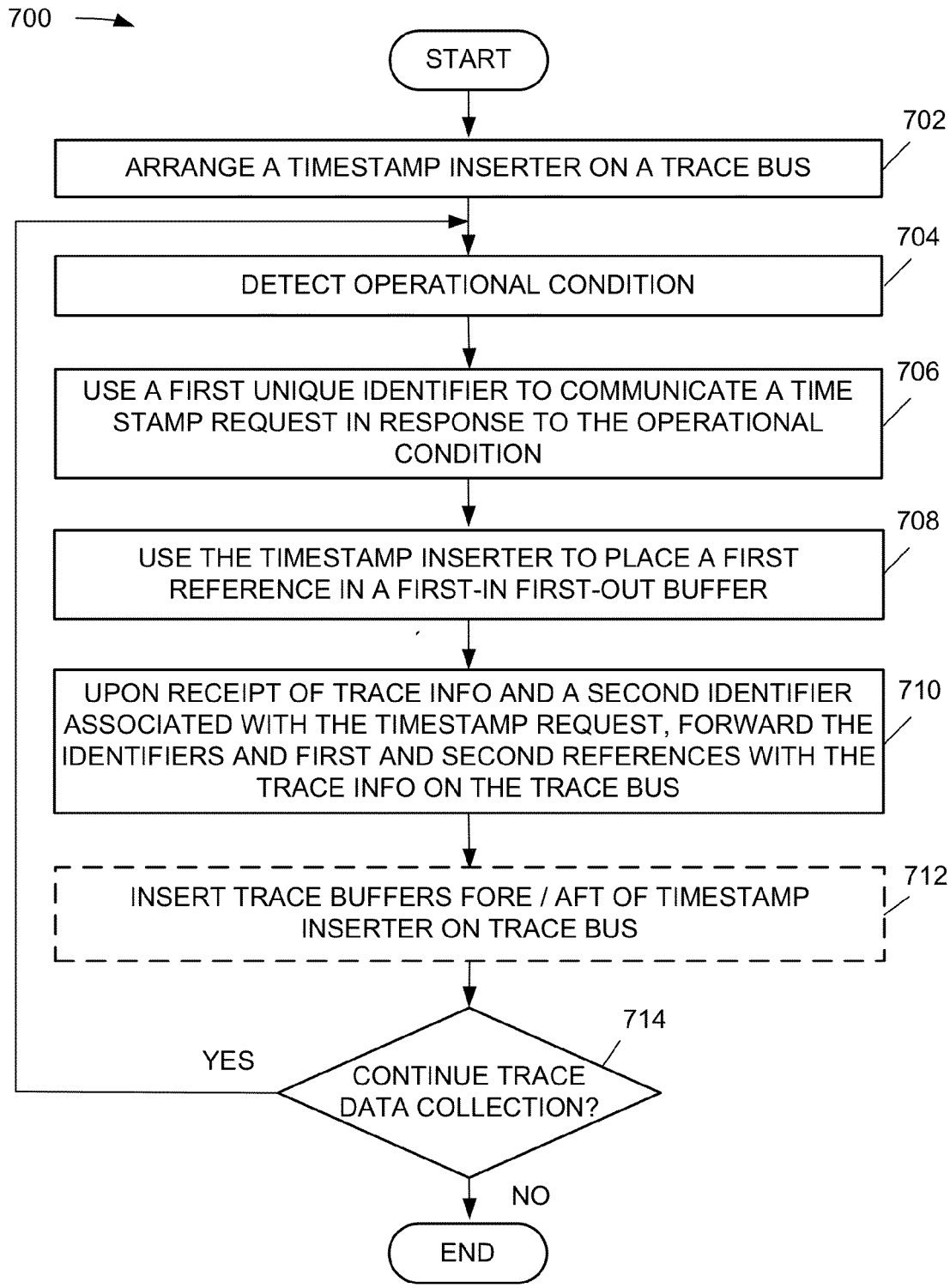
FIG. 7 is a flow chart illustrating an embodiment of a method for providing a modified trace data stream including timestamps associated with trace information from trace sources that do not natively support time stamping.

FIG. 7 is a flow chart illustrating an embodiment of a method 700 for providing a modified trace data stream including timestamps associated with trace information from trace sources that do not natively support time stamping. The method 700 begins with block 702 where a timestamp inserter is arranged on a trace bus. As indicated, the timestamp inserter is located between one or more trace data sources and one or more trace data destinations or sinks. Trace data sources can include one or more instances of processing units or cores, system trace agents, system bus structures, DDR memory controllers, peripheral hardware, specialized HW accelerators, etc. As indicated in block 704, one or more operational conditions or an event or combination of events is detected by one or more of the trace data sources. It should be understood that the one or more operational conditions may include a periodic condition such as a counter output responsive to a system clock signal. The counter output may be used to provide a first reference when a timestamp request is first indicated and a second reference when the related trace data arrives at the timestamp inserter.

In response to one of the operational condition, the event or a combination of operational conditions and events, a time stamp request is communicated with a first identifier, as indicated in block 706. In response to the request, the timestamp inserter places a reference in a first-in first-out buffer, as indicated in block 708. Thereafter, as indicated in block 710, the timestamp inserter identifies when a second identifier associated with the timestamp request arrives via the trace bus. As further indicated in block 710, the first and second identifiers, the first and second references and related timestamp data are placed on the trace data bus.

The timestamp inserter interleaves received trace data along with the timestamp identifiers and timestamp data. When processing timestamp data, the timestamp inserter will suspend or hold trace data from other trace sources. As described, the trace data received from the trace sources may include a host of separate and distinct trace data protocols. In addition, the timestamp inserter forwards the first and second identifiers, the first and second references, and the trace information on the trace bus. As shown in optional block 712, one or more trace buffers may be inserted along the trace bus upstream and/or downstream of the timestamp inserter. As also described, the modified trace data including the timestamp identifiers, the references and the timestamp information is available for any number of trace data destinations or sinks coupled to the trace bus. These destinations can include one or more instances of an ARM TPIU, a USB, a DDR bus, a PCIe interface, and addressable memory elements.

A determination is made in decision block 714, whether to continue trace data collection. When the response to the query in block 714 is affirmative, the method 700 repeats the functions described in association with blocks 704 through 714. Otherwise, when the response to the query in block 714 is negative, the method 700 terminates.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or in parallel (substantially simultaneously) with other steps without departing from the scope of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

One of ordinary skill in digital logic circuit design and/or in the use of programs that assist in the design of such circuits will be able to use the present disclosure to arrange a inserter, trace buffers, and/or aggregators as illustrated and described to design circuit blocks that can be located as desired and/or required to perform the various functions associated with the above-described elements without difficulty based on the illustrations and associated description in this specification. Therefore, disclosure of a particular set of circuit blocks or designs is not considered necessary for an adequate understanding of how to modify a trace subsystem to generate the timestamps and related information to create the modified trace data.

Additionally, one of ordinary skill in computer programming and/or trace system debugging is able to write executable computer code or scripts to direct a processor to perform the various functions associated with the above-described parser logic 491 and adjustment logic 492 without difficulty based on the flow charts and associated description in this specification. Therefore, disclosure of a particular set of program code instructions is not considered necessary for an adequate understanding of how to modify a trace data debugger to take advantage of the timestamps and related information in the modified trace data available for analysis in a trace data destination.

It should also be noted that while preferred embodiments include integrated circuits enabling digital logic on a SoC, the above described features could be arranged in a model or other environment using a combination of hardware and software or firmware. When arranged in a model or a non-silicon embodiment, the described circuit elements will be represented in software. In such arrangements, the software and/or data representing the circuit model is stored on a non-transitory computer-readable medium (CRM) and available for a processor to execute to generate simulations such as in a test and verification environment.

Although selected aspects have been illustrated and described in detail, it will be understood that various substitutions and alterations may be made herein without departing from the systems and methods for scalable trace unit time stamping, as defined by the following claims.

What is claimed is:

1. A system for providing timestamps from trace sources that do not natively support time stamping trace data, the system comprising:
   a trace source arranged to communicate trace information using a trace protocol that does not support a timestamp;
   a timestamp inserter coupled to the trace source via a trace bus and responsive to a timestamp request associated with a trace data generated by the trace source, the timestamp inserter configured to:
      forward a first current reference to a trace destination in response to receipt of the timestamp request;
      monitor the trace bus for arrival of the trace data;
      upon arrival of the trace data, modify the trace data to include the first current reference and a second current reference; and
      forward the modified trace data to the trace destination;
   wherein the trace source and the timestamp inserter are arranged on an integrated circuit; and
   wherein the modified trace data is useful for correcting timing error resulting from the trace data residing in the trace destination.

2. The system of claim 1, wherein the trace source is a hardware core trace unit.

3. The system of claim 2, wherein the trace information is interleaved with additional trace information from at least one additional source of trace information.

4. The system of claim 3, wherein the trace protocol used by the trace source is different from a second trace protocol used by the at least one additional source of trace information.

5. The system of claim 1, wherein the trace source communicates the timestamp request.

6. The system of claim 5, wherein the trace source waits for an acknowledgement signal before communicating the trace information to the timestamp inserter.

7. The system of claim 6, wherein the trace source communicates an identifier with the trace information.

8. The system of claim 1, wherein the trace destination is a first-in first-out buffer.

9. The system of claim 1, wherein the first current reference and the second current reference are counts generated from a system clock signal.

10. The system of claim 1, wherein the trace destination is a trace sink.

11. The system of claim 10, wherein the trace sink is selected from the group consisting of a trace protocol interface unit (TPIU), a universal serial bus (USB), a double-data rate (DDR) bus, a peripheral component interconnect express (PCIe) interface and a memory element.

12. The system of claim 1, wherein the timestamp inserter is arranged with timestamp request logic responsive to one or more of events that occur in the trace source and an interaction between a hardware core trace element and a processing core, the timestamp request logic arranged to insert an identifier in a timestamp request.

13. The system of claim 12, wherein timestamp insertion logic inserts a first current value responsive to the reference and the timestamp request into a first-in first-out buffer.

14. The system of claim 13, wherein the timestamp insertion logic inserts a second current value responsive to the reference when the trace information marked with the identifier arrives at the timestamp insertion logic.

* * * * *